US012580878B2

(12) United States Patent
Liu et al.

(10) Patent No.: US 12,580,878 B2
(45) Date of Patent: Mar. 17, 2026

(54) METHOD, APPARATUS, DEVICE AND STORAGE MEDIUM FOR PRESENTING SESSION MESSAGE

(71) Applicant: Beijing Zitiao Network Technology Co., Ltd., Beijing (CN)

(72) Inventors: Yang Liu, Beijing (CN); Yuxuan Zhao, Beijing (CN); Xiaoshuang Bai, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/977,648

(22) Filed: Dec. 11, 2024

(65) Prior Publication Data

US 2025/0112879 A1 Apr. 3, 2025

Related U.S. Application Data

(63) Continuation of application No. PCT/CN2023/114335, filed on Aug. 22, 2023.

(30) Foreign Application Priority Data

Aug. 23, 2022 (CN) .......................... 202211011476.6

(51) Int. Cl.
*H04L 51/046* (2022.01)
*G06F 3/0481* (2022.01)
(Continued)

(52) U.S. Cl.
CPC .......... *H04L 51/046* (2013.01); *G06F 3/0481* (2013.01); *G06F 3/0484* (2013.01); *H04L 51/02* (2013.01); *H04L 51/10* (2013.01)

(58) Field of Classification Search
CPC ....... H04L 51/046; H04L 51/02; H04L 51/10; G06F 3/0481; G06F 3/0484
See application file for complete search history.

(56) References Cited

U.S. PATENT DOCUMENTS

2015/0082189 A1 3/2015 Baer et al.
2018/0145937 A1* 5/2018 Choi ....................... H04L 51/10
(Continued)

FOREIGN PATENT DOCUMENTS

CN 111427488 A 7/2020
CN 111698147 A 9/2020
(Continued)

OTHER PUBLICATIONS

International Patent Application No. PCT/CN2023/114335; Int'l Search Report; dated Oct. 23, 2023; 2 pages.
(Continued)

*Primary Examiner* — David E Choi
(74) *Attorney, Agent, or Firm* — BakerHostetler

(57) ABSTRACT

Embodiments of the disclosure provide a method, an apparatus, a device, and a computer-readable storage medium for presenting a session message. The method includes obtaining at least one message in a target session; and presenting, in a session aggregation interface, a target component corresponding to the target session. The target component is configured to present description information of the target session and a visual representation of the at least one message, a representation type of the visual representation is determined based on a message type of the at least one message, and the session aggregation interface is configured to present at least one visual component including the target component. Therefore, according to embodiments of the disclosure, the visual representation of the message received in the session can be conveniently provided on the session aggregation interface, such that the user can conveniently and intuitively obtain the message content in the session.

20 Claims, 7 Drawing Sheets

(51) Int. Cl.

| | |
|---|---|
| *G06F 3/0484* | (2022.01) |
| *H04L 51/02* | (2022.01) |
| *H04L 51/10* | (2022.01) |

(56) References Cited

U.S. PATENT DOCUMENTS

| | | | |
|---|---|---|---|
| 2021/0152503 A1 | 5/2021 | Rodriguez et al. | |
| 2022/0368660 A1* | 11/2022 | Niess | H04L 12/1818 |
| 2023/0032666 A1 | 2/2023 | Wu et al. | |
| 2023/0325053 A1 | 10/2023 | Wang et al. | |
| 2023/0396571 A1* | 12/2023 | Ma | H04L 51/56 |
| 2023/0421517 A1* | 12/2023 | Kennedy | G06F 3/0482 |
| 2024/0288990 A1* | 8/2024 | Yang | G06F 1/1652 |
| 2024/0305587 A1* | 9/2024 | Jayaraman | G06F 3/0481 |

FOREIGN PATENT DOCUMENTS

| | | |
|---|---|---|
| CN | 112054950 A | 12/2020 |
| CN | 112165390 A | 1/2021 |
| CN | 112287220 A | 1/2021 |
| CN | 113010254 A | 6/2021 |
| CN | 113179206 A | 7/2021 |
| CN | 113946403 A | 1/2022 |
| CN | 114650264 A | 6/2022 |
| CN | 115396391 A | 11/2022 |
| CN | 115567471 A | 1/2023 |
| JP | 2016-035750 A | 3/2016 |
| JP | 2016-177797 A | 10/2016 |
| JP | 2018-524717 A | 8/2018 |
| JP | 2018-139115 A | 9/2018 |
| JP | 2018-151798 A | 9/2018 |
| WO | WO 2022/127604 A1 | 6/2022 |

OTHER PUBLICATIONS

China Patent Application No. 202211011476.6; Office Action; dated Dec. 19, 2023; 23 pages.

China Patent Application No. 202211011476.6; Notification to Grant; dated Jul. 24, 2024; 6 pages.

"With more downloads than TikTok and SHEIN, why is this social App so popular?" https://36kr.com/p/1730725253840136; May 2022; accessed Aug. 4, 2024; 32 pages.

"Topping the US social networking charts in 12 days and gaining 3 million users, what's the magic of Locket Widget apps?"; https://xw.qq.com/cmsid/20220422A0BIV200; Apr. 2022; accessed Dec. 10, 2024; 25 pages.

"Social Applications for desktop Widgets (2)"; https://xw.qq.com/cmsid/20220525A07KLZ00; accessed Aug. 4, 2022; 4 pages.

Japanese Patent Application No. 2024-572612; Office Action dated Jun. 7, 2025, 9 pages with machine translation.

European Patent Application No. 23856639.2; Extended European Search Report dated Aug. 5, 2025, 10 pages.

* cited by examiner

FIG. 1                      FIG. 2

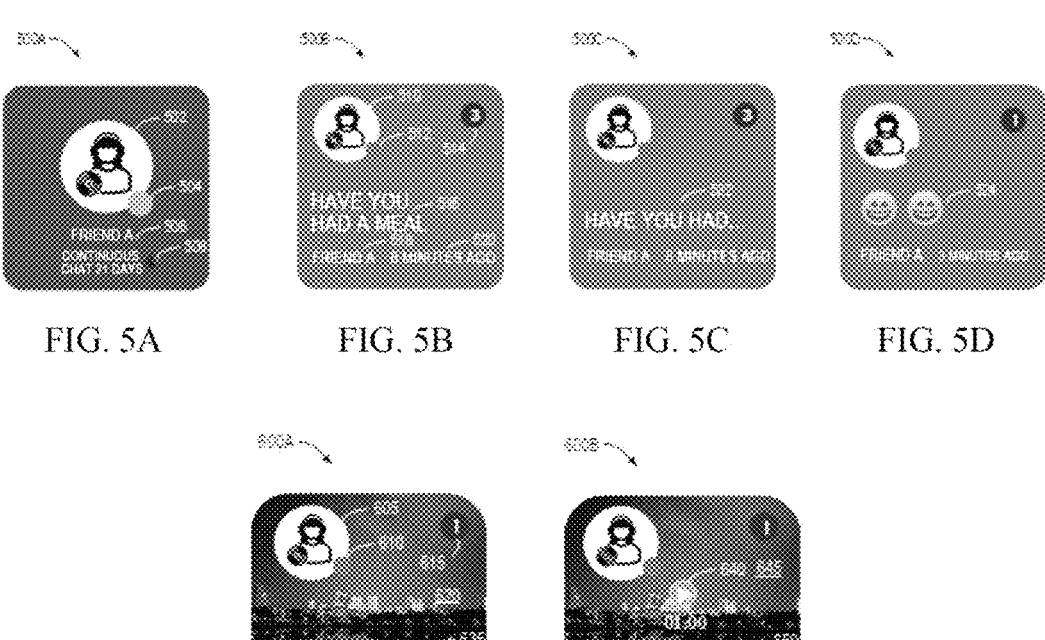
FIG. 5A          FIG. 5B          FIG. 5C          FIG. 5D
FIG. 6A          FIG. 6B
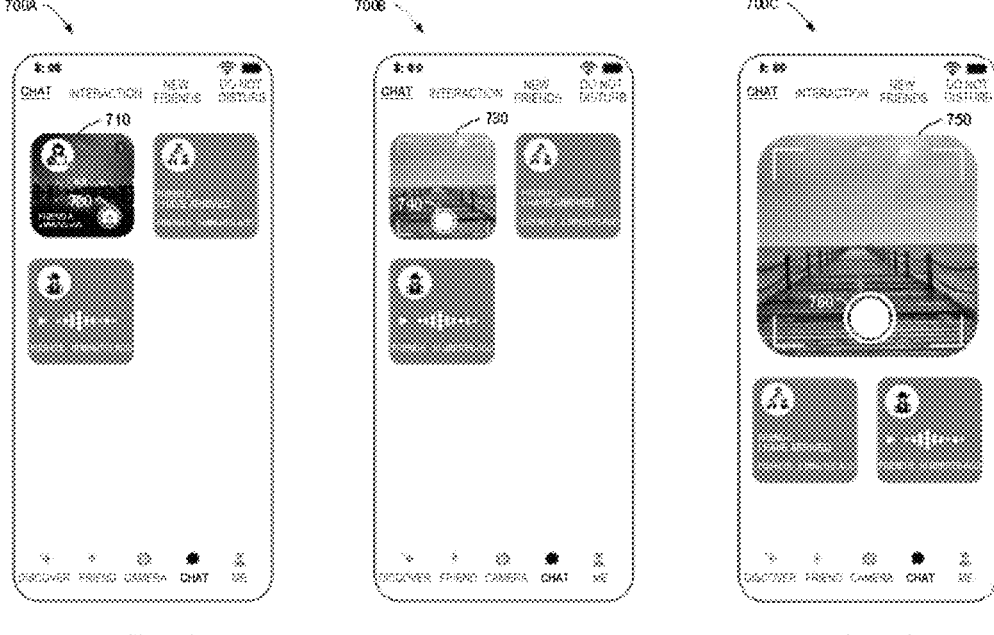
FIG. 7A          FIG. 7B          FIG. 7C

1100

1500

1600

METHOD, APPARATUS, DEVICE AND STORAGE MEDIUM FOR PRESENTING SESSION MESSAGE

CROSS-REFERENCE

This application is a continuation of International Patent Application No. PCT/CN2023/114335, filed on Aug. 22, 2023, which claims the benefit of Chinese Patent Application No. CN202211011476.6, filed on Aug. 23, 2022, entitled "METHOD, APPARATUS, DEVICE AND STORAGE MEDIUM FOR PRESENTING SESSION MESSAGE", the entire content of both of which is incorporated herein by reference.

FIELD

Example embodiments of the present disclosure generally relate to the field of computers, and more particularly, to a method, an apparatus, a device, and a computer-readable storage medium for presenting a session message.

BACKGROUND

With the development of computer technologies, more and more people rely on the Internet for daily communication. Instant messaging has become one of the major Internet services commonly used by people. Some specialized instant messaging applications may provide users with specialized instant messaging services, and some other platforms (such as video platforms, music platforms, etc.) are often integrated with corresponding instant messaging functions.

SUMMARY

In a first aspect of the present disclosure, a method for presenting a session message is provided. The method includes obtaining at least one message in a target session; and presenting, in a session aggregation interface, a target component corresponding to the target session. The target component is configured to present description information of the target session and a visual representation of the at least one message, a representation type of the visual representation is determined based on a message type of the at least one message, and the session aggregation interface is configured to present at least one visual component including the target component.

In a second aspect of the present disclosure, an apparatus for presenting a session message is provided. The apparatus includes an obtaining module and a presenting module. The obtaining module is configured to obtain at least one message in a target session. The presenting module is configured to present, in a session aggregation interface, a target component corresponding to the target session. The target component is configured to present description information of the target session and a visual representation of the at least one message, a representation type of the visual representation is determined based on a message type of the at least one message, and the session aggregation interface is configured to present at least one visual component including the target component.

In a third aspect of the present disclosure, an electronic device is provided. The electronic device includes at least one processing unit, and at least one memory coupled to the at least one processing unit and storing instructions executable by the at least one processing unit. The instructions, when executed by the at least one processing unit, cause the electronic device to perform the method of the first aspect.

In a fourth aspect of the present disclosure, a computer-readable storage medium is provided. The medium stores a computer program, and when the program is executed by the processor, the method of the first aspect is implemented.

It should be understood that the content described in the content part of the present disclosure is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, in which:

FIG. 1 illustrates a schematic diagram of a session list presentation according to a conventional solution;

FIG. 2 illustrates a schematic diagram of an example environment in which embodiments of the present disclosure may be implemented;

FIGS. 5A-5D illustrate schematic diagrams of example card-based components according to some embodiments of the present disclosure;

FIGS. 6A and 6B illustrate schematic diagrams of example card-based components according to further embodiments of the present disclosure;

FIGS. 7A-7C illustrate schematic diagrams of replying an image or a video with a card-based component according to some embodiments of the present disclosure;

DETAILED DESCRIPTION

Figures 3A, 3B, 3C, 4A, 4B, 4C:
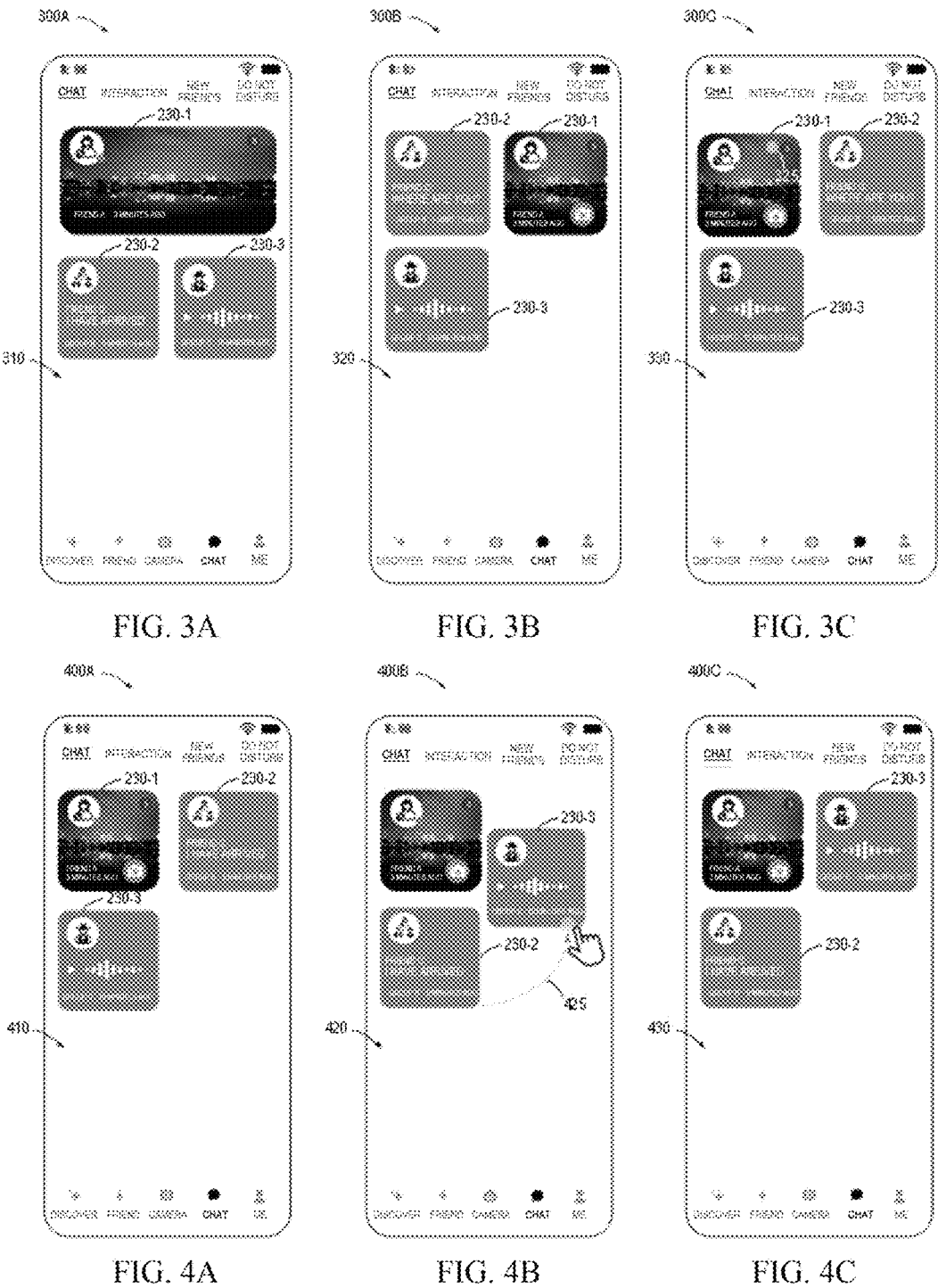
FIGS. 3A-3C illustrate schematic diagrams of layouts of card-based components according to some embodiments of the present disclosure.
FIGS. 4A-4C illustrate schematic diagrams of adjusting layouts according to some embodiments of the present disclosure.

Embodiments of the present disclosure will be described in more detail below with reference to the accompanying drawings. While certain embodiments of the present disclosure are illustrated in the accompanying drawings, it should be understood that the present disclosure may be implemented in various forms, and should not be construed as limited to the embodiments set forth herein, but rather, these embodiments are provided for a more thorough and complete understanding of the present disclosure. It should be understood that the drawings and embodiments of the present disclosure are for illustrative purposes only and are not intended to limit the scope of the present disclosure.

In the description of the embodiments of the present disclosure, the terms "including" and the like should be understood to include "including but not limited to". The term "based on" should be understood as "based at least in part on". The terms "one embodiment" or "the embodiment" should be understood as "at least one embodiment". The term "some embodiments" should be understood as "at least some embodiments". Other explicit and implicit definitions may also be included below.

When people use instant messaging services, they can usually establish a plurality of sessions. Instant messaging services may generally provide a session aggregation interface to facilitate people to manage different sessions. The session aggregation interface may generally further provide previews of messages in different sessions.

FIG. 1 illustrates a schematic diagram of a session list presentation according to the conventional solution. As illustrated in FIG. 1, the electronic device 110 (e.g., a mobile terminal) may present a session aggregation interface 120, which presents a plurality of current sessions of the user in a form of a list.

However, the message preview of different sessions in the list is in a single form, which merely describes various types of messages through text. This preview method is generally inefficient, making it difficult for the user to determine whether he/she needs to enter the corresponding session in time to process the corresponding message.

For example, taking a session with "Friend A" as an example, the list indicates that a new picture message is received in the session with the text "send a picture". However, the user needs to enter the session to view the picture message, which increases the user's interaction cost.

Embodiments of the present disclosure provide a solution for presenting a session message. According to the solution, a visual component associated with the target session may be provided. The visual component may be configured to provide richer previews of messages of the target session. For example, the visual component may include a card-based component, a tile-based component, etc. In some embodiments, the visual component may be independently editable, e.g., created, moved, deleted, etc.

Furthermore, a visual representation corresponding to at least one message in the target session may be presented in the visual component, and a type of the visual representation is determined based on a message type of the at least one message. For example, when the message to be reminded is a picture message, the visual representation of a picture form may be presented.

Thus, embodiments of the present disclosure may efficiently present messages in sessions to the user through the visual component, and may provide visual presentations of diverse types as the previews of the messages. In this way, the efficiency of the user in obtaining the message may be improved, and the interaction cost of the user may be reduced.

Various example implementations of this scheme are described in detail below with reference to the accompanying drawings.

Example Environment

Reference is first made to FIG. 2, which schematically illustrates a schematic diagram of an example environment 200 in which example embodiments according to the present disclosure may be implemented. As illustrated in FIG. 2, the example environment 200 may include an electronic device 210.

As illustrated in FIG. 2, the electronic device 210 may be, for example, an intelligent terminal (e.g., a smart phone), which may provide a graphical interface 220 as illustrated in FIG. 1. For example, the interface 220 may be a session aggregation interface of an instant messaging.

For example, the interface 220 may be provided by an instant messaging application loaded on the electronic device 210 or other applications capable of providing instant messaging services (hereinafter collectively referred to as a target application). The target application may provide the user with instant messaging services with other users or groups.

In the target application, for example, the user may create one or more sessions. For example, each session may correspond to a chat with a different user and/or group. For example, a session may correspond to a one-on-one chat with a specific friend, or a session may also correspond to a group chat with a plurality of friends.

In some embodiments, as illustrated in FIG. 2, the electronic device 210 may provide, in the interface 220, visual components 230-1, 230-2, and 230-3 (individually or collectively referred to as the visual component 230) corresponding to one or more sessions of the target application.

As an example, the visual component 230 may, for example, have a card-like style, which may be a suitable shape, such as a square, a rectangle, a circle, an ellipse, a rounded rectangle, etc. In the examples of the present disclosure, the visual component 230 is schematically illustrated as having a rounded rectangle shape, and it is not intended to constitute a limitation of the present disclosure. In some embodiments, the visual component 230 may include a tile-based component that may have a presentation style similar to a desktop tile component.

As will be described in detail below, the visual component 230 may be configured to present the visual representation of the message in the session. For example, the visual component 230 may provide a visual representation corresponding to the message type, to facilitate the user to more conveniently obtain the preview of the message in the session.

In some embodiments, for example, the electronic device 210 may support the user to configure the presentation style (such as a card-based presentation, or a list-based presentation) of the session aggregation interface. For example, the user may set the session aggregation interface to the card-based presentation as illustrated in FIG. 2 through a setting menu. Alternatively, the electronic device 210 may further provide a style switching control on the session aggregation interface, to facilitate the user to switch the style of the session aggregation interface from the list-based display to the card-based display, or from the card-based display to the list-based display in real time.

It should be understood that although the electronic device 210 in FIG. 2 is illustrated as a smart phone, it may also be any other suitable device, including but not limited to: a tablet computer, a notebook computer, a desktop computer, a personal digital assistant, a smart wearable device, a vehicle-mounted device, etc.

Various example embodiments of presenting the message with the visual component will be described in detail below. Example Layout of Visual component Before introducing how to present the message in the session with the visual component, an example layout of the visual component in the session aggregation interface will be first described with reference to FIGS. 3A-3C and 4A-4C.

In some embodiments, as illustrated in FIG. 2, the visual components 230 corresponding to different sessions may have substantially the same display style, such as size and/or shape. Alternatively, as illustrated in FIG. 3A, for example, in the interface 310, the visual component 230 may have different display styles.

In some embodiments, for example, the size and/or shape of the visual component 230 may be configurable by a user. For example, each visual component 230 may have a variety of predetermined sizes and/or shapes, and may be adjusted accordingly based on the user selection.

As a further example, the user may manually adjust the size and/or shape of the visual component 230-1. For example, as illustrated in FIG. 3A, in the interface 310, the user may, for example, enlarge the length of the visual component 230-1 by dragging the edge of the visual component 230-1.

In this way, for example, embodiments of the present disclosure may conveniently configure a display region of card components of different sessions, thereby facilitating management of presentation priorities of different sessions. For example, the user may set the session of an important contact to have the visual component with a larger size, such that it is more convenient to locate to the contact, and obtain the message in the corresponding session.

In some embodiments, in the session aggregation interface, the display location of the card components 230 corresponding to different sessions may be dynamically changed based on the time of the latest message (e.g., the latest received message or the latest sent message) in each session.

Taking FIG. 3B as an example, in the interface 320, the session corresponding to "Group B" received a new message "1 minute ago", which is later than the latest message in the session corresponding to "Friend A" (for example, 3 minutes ago). Thus, for example, in the interface 320, the visual component 230-2 corresponding to the session of the "Group B" may be automatically adjusted to the front of the visual component 230-1 corresponding to the session of the "Friend A". It should be understood that "front" here is intended to indicate the location with a higher display priority, for example, it may indicate different directions under different interface display logics.

In some embodiments, the visual component 230 may also be configured at a predetermined location in the interface based on the user operation (e.g., a gesture operation). For example, with FIG. 3C as an example, in the interface 330, for example, the user may pin the visual component 230-1 to a specific location in the interface 330. For example, the pinned visual component 230-1 may present a graphic identification or a text identification 325 indicating that its location is pinned.

For example, the visual component 230-1 may be pinned by the user to the top leftmost location in the interface 330, and its location will not change with message sending and/or message reception in other sessions.

For example, although the time "1 minute ago" of the latest message in the session corresponding to the visual component 230-2 is later than the time "3 minutes ago" of the latest message in the session corresponding to the visual component 230-1, the visual component 230-2 is still displayed behind the visual component 230-1.

In some embodiments, for example, the user may also adjust the visual component 230 to an appropriate location in the session aggregation interface. FIGS. 4A-4C illustrate schematic diagrams of adjusting layouts according to some embodiments of the present disclosure.

For example, in the interface 410, the visual component 230 may have an initial layout. Furthermore, as illustrated in FIG. 4B, for example, the user may move the visual component 230-3 from a first location in the initial layout to a second location illustrated in FIG. 4B by dragging 425.

As illustrated in FIG. 4B, in the interface 420, the electronic device 210 may determine that the original display location of the visual component 230-2 is occupied, and automatically move the display location of the visual component 230-2 backward. Further, as illustrated in FIG. 4C, after the user releases the visual component 230-3, it may be automatically adjusted to the corresponding display location.

In this way, compared with the traditional list-based session aggregation interface, embodiments of the present disclosure may allow the user to configure the session aggregation interface more flexibly, thereby facilitating the management of presentation priorities of different sessions.

In addition, through flexible layout, the interaction may be tailored to the user's operation habit. For example, the user may be more accustomed to operating objects at the bottom of the interface. Then, for example, the user may pin frequently used sessions to be displayed at the bottom of the interface, to better conform to the operation habit of the user.
Example Style of Visual component
Example One: Absence of Session Message FIG. 5A illustrates an example visual component 500A according to embodiments of the present disclosure. The visual component 500A may correspond to a status in which there are no messages in the session. As illustrated in FIG. 5A, for example, the visual component 500A may include description information of the session associated with the visual component 500A (e.g., a one-on-one session with the "Friend A").

For example, the description information may include the identification of a participant of the session, such as an avatar 502 of the "Friend A" and an identity identification 506 (its nickname and/or remark) of the "Friend A". In the example of FIG. 5A, the visual component 500A is associated with the one-on-one session with the "Friend A". Therefore, the identity identification 506 may also be understood as the identification of the one-on-one session.

Additionally, for example, the visual component 500A may further present a status identification 504 of the participant, which may indicate whether the participant is currently in an online state through different colors. For example, green may indicate that the participant is currently in the online state, and gray may indicate that the participant is currently in an offline state.

In addition, as illustrated in FIG. 5A, the visual component 500A may further present a continuous status of the session, e.g., "continuous chat for 21 days", to indicate that the session is in a long-term active state.

In some embodiments, in the absence of the session message, the background of the visual component 500A may be filled with a predetermined color. Alternatively, the fill color of the background of the visual component 500A may be determined based on the color of the avatar of at least one participant (e.g., "Friend A") of the session. For example, the fill color of the background may be the color with the highest frequency of appearance among the colors of the avatar. In this way, embodiments of the present disclosure may enable the background color of the visual component 500A to be displayed more harmoniously with the overall color of the avatar.

Example Two: Text Symbol Message

FIGS. 5B and 5C illustrate example visual components 500B and 500C for presenting a text symbol message in the session. The text symbol message refers to the message composed of one or more texts and/or symbols. The symbols may include, for example, emoticons, emojis, etc.

As illustrated in FIG. 5B, the visual component 500B may present description information of the session associated with the visual component 500B (e.g., the one-on-one session with the "Friend A").

For example, the description information may include the identification of a participant of the session, such as the avatar 510 of the "Friend A" and an identity identification 518 (its nickname and/or remark) of the "Friend A". In the example of FIG. 5B, the visual component 500B is associated with the one-on-one session with the "Friend A". Therefore, the identity identification 518 may also be understood as the identification of the one-on-one session.

Similarly, for example, the visual component 500A may further present a status identification 512 of the participant, which may indicate whether the participant is currently in an online state through different colors. For example, green may indicate that the participant is currently in the online state, and gray may indicate that the participant is currently in an offline state. In addition, the visual component 500B may further include a number identification 514, to indicate the number of unread messages in the session.

Additionally, the visual component 500B may present a visual representation 516 of the text symbol message in the session. For example, the text symbol message presented may be the latest unread message in the session.

In some embodiments, when the length of the text symbol message is less than a threshold length such that the visual component 500B may be fully presented, the visual component 500B may present the entire content of the text symbol message as its corresponding visual representation. Additionally, the visual component 500B may further present the time 520 when the message is received.

In some embodiments, when the length of the text symbol message reaches the threshold length, the visual component may only present partial content of the text symbol message as its visual representation.

For example, when the length of the received text symbol message reaches the threshold length, the visual component may only present partial content of the text symbol content as its visual representation. For example, the unpresented content may be replaced by an ellipsis. For example, as illustrated in FIG. 5C, in the visual component 500C, when the text symbol message is "Have you had lunch", its visual representation 522 may only present partial content of the text symbol message, such as "Have you had . . . ".

FIG. 5D further illustrates a visual component 500D according to yet further embodiments of the present disclosure. As illustrated in FIG. 5D, when the text symbol message composed of an expression is received, the visual component 500D may render the expression accordingly as its visual representation 524, although the expression may be transmitted in an expression-coded manner in the actual message.

Similarly, the visual component 500C may similarly present an identification of the sender of the message and the time when the message is received.

In some embodiments, when the user selects the visual representations 516, 522, or 524 in the visual components 500B, 500C, or 500D, the electronic device 210 may accordingly present a session interface of the target session. The session interface is configured to present the message corresponding to the visual representation. It should be understood that the "session interface" is an interface configured to provide functions such as message viewing and message replying under a single session.

For example, in the case where the visual component 500C only presents incomplete content of the message as its visual representation, for example, when the user clicks the visual representation 522 or other locations in the visual component 500C, the electronic device 210 may present the session interface of the session to present the complete content of the message.

In this way, embodiments of the present disclosure may conveniently and efficiently provide the preview of the text symbol message in the specific session through the visual component, thereby improving the efficiency of the user in obtaining the text symbol message.

Example Three: Image Content Message

In some embodiments, the electronic device 210 may further provide the visual representation of the image content message in the session through the visual component. The image content message is a message that includes the visual image content, and may include a picture message (e.g., a static picture or a dynamic picture) and a video message.

FIG. 6A illustrates an example visual component 600A according to embodiments of the present disclosure. As illustrated in FIG. 6A, the visual component 600A may present description information of the session associated with the visual component 600A (e.g., the one-on-one session with "Friend A").

For example, the description information may include the identification of a participant of the session, such as an avatar 602 of the "Friend A" and an identity identification 625 (its nickname and/or remark) of the "Friend A". In the example of FIG. 6A, the visual component 600A is associated with the one-on-one session with the "Friend A". Therefore, the identity identification 625 may also be understood as the identification of the one-on-one session.

Similarly, for example, the visual component 600A may further present a status identification 610 of the participant, which may indicate whether the participant is currently in an online state through different colors. For example, green may indicate that the participant is currently in the online state, and gray may indicate that the participant is currently in an offline state. In addition, the visual component 600A may further include a number identification 615, to indicate the number of unread messages in the session.

Additionally, the visual component 600A may present a visual representation 620 of the picture message in the session. For example, the electronic device 210 may directly fill the picture in the picture message as at least a portion of the background of the visual component 600A as the visual representation 620 of the picture message. The picture in the picture message may include, for example, a static picture and/or a dynamic picture.

Additionally, the visual component 600A may further present the time 630 when the message is received. In addition, for example, the visual component 600A may further include a shortcut reply entry for replying to the picture message, such as a picture or a video reply control 635. For example, the user may select the picture or the video reply control 635 to activate the image acquisition device of the electronic device 210 to acquire a reply picture or a reply video. Further, the reply picture or the reply video may be automatically sent to the target session, e.g., as a reply to the received picture message.

As another example, FIG. 6B illustrates an example visual component 600B according to embodiments of the present disclosure. As illustrated in FIG. 6B, the visual component 600B may present a visual representation 645 of a video message in the session. For example, the electronic device 210 may directly fill a specific frame in the video message as at least a portion of the background of the visual component 600B as the visual representation 645 of the video message. In some embodiments, for example, the specific frame may be a start frame, a cover frame, or any other specified frame of the video message.

Additionally, the visual component 600B may further provide information about the length of the video. In some embodiments, for example, when the user first views the visual component 600B, the visual component 600B may play, in a visual component window, part or all of the content of the video message in a muted state. Alternatively, for example, the user may click a play button 640 in the visual component to trigger muted or non-muted play of the video message in the visual component.

Additionally, the visual component 600B may similarly present an identification of the sender of the video message and the time when the video message is sent and/or received. In addition, for example, the visual component 600B may further include a shortcut entry for replying to the voice message, such as a picture or a video reply entry 650. For example, the user may select the picture or the video reply entry 650 to activate the image acquisition device of the electronic device 210 to acquire a reply picture or reply video. Further, the reply picture or the reply video may be automatically sent to the target session, e.g., as a reply to the received video message.

In some embodiments, for example, when the user selects the visual representation 620 in the visual component 600A, or clicks a location other than the reply entry 635 in the visual component 600A, the electronic device 210 may present the session interface of the target session to present the picture message. In some embodiments, for example, the picture message may be presented in the session interface of the target session in a full-screen mode.

As another example, for example, when the user selects the visual representation 645 in the visual component 600B, or clicks a location other than the play button 640 and the reply entry 650 in the visual component 600B, the electronic device 210 may present the session interface of the target session to present the video message.

In some embodiments, in the session interface of the target session, the video message may be presented in the full-screen mode and be played automatically. Alternatively, in the session interface of the target session, the video message may be presented in a non-full-screen mode, and be played automatically in a muted mode, or start playing in response to the user selection.

In some embodiments, for example, when the user selects the reply entry 635 in the visual component 600A or the reply entry 650 in the visual component 600B, the electronic device 210 may convert the visual component 600A or the visual component 600B to a framing state.

Specifically, FIGS. 7A-7C illustrate schematic diagrams of replying an image or a video with the visualization component. As illustrated in FIG. 7A, for example, in the interface 700A, the electronic device 210 may present a visual component 710, which may be configured to present the image content in the session, and may include a picture or a video reply entry 720.

In some embodiments, after a selection of the picture or the video reply entry 720 is received, the electronic device 210 may present an interface 700B, to switch the visual component 710 to the framing state 730.

As illustrated in FIG. 7B, in the framing state 730, the visual component 710 may acquire the image or the video with the image acquisition device (e.g., a front camera or a rear camera) of the electronic device 210. Additionally, in the framing state 730, the visual component 710 may include a viewfinder 740 for controlling the shooting, pausing, or stopping of the image or the video.

In some embodiments, after a selection of the picture or the video reply entry 720 is received, the electronic device 210 may present an interface 700C to switch the visual component 710 to the framing state 750.

As illustrated in FIG. 7C, in the framing state 750, the visual component 710 may be adjusted to have a larger display size to facilitate acquiring the image or the video with the image acquisition device (e.g., the front camera or the rear camera) of the electronic device 210. Additionally, in the framing state 750, the visual component 710 may include a viewfinder 760 for controlling the shooting, pausing, or stopping of the image or the video.

Further, after the user completes the recording of the reply picture or the reply video with the visual component 710 in the framing state 730 or the framing state 750, the electronic device 210 may cause the reply picture or the reply video to be automatically sent to the target session. In some embodiments, in the session interface, the reply picture or the reply video may be marked as the reply message for the selected picture message or video message.

In this way, embodiments of the present disclosure may quickly provide a preview of the picture/video message with the visual component, and may further support a quick reply to the picture/video message, thereby improving efficiency of message acquisition and interaction.

Example Four: Message of Specific Type Such as Voice

In some embodiments, the electronic device 210 may further provide, through the visual component, the visual representation of a message of a specific type such as an audio message in the session. The message of the specific type may include, for example, a voice message, a red packet message, a location message, a conference message, a file message, an invitation message, a call request message, or a hyperlink message, etc.

Figures 8A, 8B, 8C, 9A, 9B, 9C, 10A, 10B, 10C:
FIGS. 8A-8C illustrate schematic diagrams of example card-based components according to still further embodiments of the present disclosure.
FIGS. 9A-9C illustrate schematic diagrams of switching different messages according to some embodiments of the present disclosure.
FIGS. 10A-10C illustrate schematic diagrams of example card-based components according to still further embodiments of the present disclosure.

FIG. 8A illustrates an example visual component 800A according to embodiments of the present disclosure. As illustrated in FIG. 8A, similar to the other visual components previously introduced, the visual component 800A may also present description information of the session (e.g., the one-on-one session with "Friend A") associated with the visual component 800A.

For example, the description information may include the identification of a participant of the session, such as the avatar of the "Friend A" and the identity identification (its nickname and/or remark) of the "Friend A". In the example of FIG. 8A, the visual component 800A is associated with the one-on-one session with the "Friend A". Therefore, the identity identification may also be understood as the identification of the one-on-one session.

Similarly, for example, the visual component 800A may further present a status identification of the participant, which may indicate whether the participant is currently in an online state through different colors. For example, green may indicate that the participant is currently in the online state, and gray may indicate that the participant is currently in an offline state.

Additionally, the visual component 800A may graphically present the visual representation 820 of the voice message in the target session. For example, the visual component 800A may indicate that a voice message has been received in the session through a graphical representation of an audio waveform.

In addition, for example, the visual component 800A may be used as a play control 810 for playing the voice message. For example, after a selection of the play control 810 is received, the electronic device 210 may directly play the voice message without jumping to the session interface of the target session.

Additionally, as illustrated in FIG. 8A, the visual component 800A may further provide a voice reply entry 830 for quickly replying to the audio. For example, the user may select the voice reply entry 830 to activate a voice acquisition device of the electronic device 210 to acquire the reply audio. Further, the reply audio may be automatically sent to the target session, e.g., as a reply to the received voice message.

In some embodiments, for example, when the user clicks the visual representation 820 in the visual component 800A, or the user clicks a portion of the visual component 800A other than the voice reply entry 830 and the play control 810, the electronic device 210 may, for example, present the session interface of the target session to present the voice message. In some embodiments, in the session interface, the voice message may be played automatically.

FIG. 8B illustrates an example visual component 800B for presenting a red packet message according to an embodiment of the present disclosure. For example, as illustrated in FIG. 8B, the visual component 800B may be configured to present the red packet message in the target session. At least a portion of the background of the visual component 800B may be filled with a red packet pattern as the visual representation 850 of the red packet message.

Additionally, the visual component 800B may further include an interaction entry 840. When the user selects the interaction entry 840, the red packet in the red packet message may be automatically opened without jumping to the session interface of the target session. Additionally, for example, after the red packet is opened, the visual component 800B may display description information related to the obtained red packet, such as the amount of the red packet, etc.

FIG. 8C illustrates an example visual component 800C for presenting a call request message according to an embodiment of the present disclosure. For example, the visual component 800C may present the call request message (e.g., a voice call request or a video call request) in the target session. As illustrated in FIG. 8C, the visual component 800C may include a static or dynamic graphical representation 860 corresponding to the call request message as the visual representation 860 of the call request message.

Additionally, the visual component 800C may further include a reply entry 870. When the user selects the reply entry 870, the voice call or video call may be automatically replied without jumping to the session interface of the target session. Alternatively, the user may also click the visual representation 860 to reply the voice call or the video call without jumping to the session interface of the target session.

Additionally, taking the video call as an example, after the video call is established, the visual component 800C may further be configured to present a video of at least one participant in the video call.

Example styles of the visual component are described above with reference to the voice messages, the red packet messages and the call request messages. It should be understood that embodiments of the present disclosure further support the use of the visual component to present visual presentations of messages of other specific types.

For example, for a location message received in the session, in the visual component, the electronic device 210 may present a graphical location representation in the form of a map, or provide a text representation such as "sent a location".

For example, for a conference message received in the session, in the visual component, the electronic device 210 may present a graphical symbol of the conference, or provide a text representation such as "sent conference information,".

For example, for a file message received in the session, in the visual component, the electronic device 210 may present a graphical symbol of the file (e.g., based on a format of the file), or provide a text representation such as "sent a file".

For example, for an invitation message (e.g., a group invitation) received in the session, in the visual component, the electronic device 210 may present a graphical symbol (e.g., the avatar of the group to be invited) corresponding to the invitation message, or provide a text representation such as "sent a group invitation".

For example, for a hyperlink message received in the session, in the visual component, the electronic device 210 may present a quick preview content of the link, or provide a text representation such as "sent a hyperlink".

For example, in the case of using visual components to present the visual representation of the message of the specific type, the visual representation may further support the corresponding management interaction, such as playing the voice message, opening the red packet, previewing the file, joining the conference, etc.

In this way, embodiments of the present disclosure may conveniently and efficiently provide previews of messages of various types in a specific session through the visual component, thereby improving the efficiency of the user in obtaining the message.

Other Examples

Various examples of utilizing visual components to quickly present relevant messages are described above with reference to the text symbol message, the picture message, the video message, the voice message, and messages of other specific types. In addition, examples regarding the image and video reply entry and the voice reply entry are also described above in combination with the picture and video message, and the voice message.

It should be understood that the above shortcut reply entry may also be applied to any other suitable type of message. In some embodiments, the electronic device 210 may further provide an expression reply entry with the visual component. For example, the expression reply entry may provide a set of candidate expressions for selection. For example, the user may click any candidate expression to complete a quick expression reply to the message. For example, the expression may be sent to the session as an independent message, or the expression may be taken as a quick reply to a specific message, and be presented in association with the message in the session interface, e.g., as a like for the message.

Based on the various examples described above, embodiments of the present disclosure may determine the representation type (e.g., the text representation, the graphical representation, or the video representation, etc.) of the visual representation of the message in the visual component based on a message type (e.g., the text symbol message, the picture video message, the voice message, or the message of the specific type, etc.) of the message received in the session.

Additionally, or alternatively, the fill pattern of the background in the visual component may be determined based on an attribute associated with the target session. For example, in the case where there is no message or there is the text symbol message in the session, the fill color of the background of the visual component may be determined based on, for example, the avatar (e.g., the avatar of the friend) of the participant associated with the target session, or the image identification (e.g., the avatar of the group chat) of the target session.

In some embodiments, the fill pattern of the background in the visual component may be determined based on the attribute associated with the visual representation. For example, in the case where the visual representation includes graphical information, the fill color of the background in the visual component may be determined based on the color of the graphical information. For example, the visual representation includes the emoticon, then the background of the visual component may be filled with a color close to a color system of the emoticon but with different saturations, thus forming a more holistic color display style.

Further, as discussed above with reference to various examples, it may be seen that in the visual component, the display style and/or display location of the description information (e.g., the nickname, the avatar, the status identification, etc.) of the target session may be determined based on the representation type of the visual representation to be presented. For example, in the case where the image content is presented as the visual representation, the specific content and/or the presentation style of the description information presented may be different than the case where the text symbol content is presented as the visual representation.

Therefore, embodiments of the present disclosure may provide preview of messages of diverse types, thereby improving the efficiency of the user in obtaining the message.

Furthermore, it should be understood that although the examples described above describe the logic of visual components presenting messages with reference to the one-on-one chat scenario, the visual component may also utilize similar presentation logic to display the message in a group chat session. Similar to presenting messages in the one-on-one chat session, the visualization component corresponding to the group chat session may present the identification (e.g., the nickname or the avatar) of the speaker of the corresponding message, to facilitate the user to intuitively know which user in the group chat sent the message.
Presentation of a Plurality of Messages
Example One In some embodiments, embodiments of the present disclosure may further provide the prompt and switching presentation of a plurality of unread messages with the visual component.

FIG. 9A illustrates an example visual component 900A according to some embodiments of the present disclosure. As illustrated in FIG. 9A, the visual component 900 may present description information of the session associated with the visual component 900 (e.g., the one-on-one session with "Friend A").

For example, the description information may include the identification of a participant of the session, such as the avatar 910 of the "Friend A" and the identity identification 950 (its nickname and/or remark) of the "Friend A".

Similarly, for example, the visual component 900 may further present a status identification 920 of the participant, which may indicate whether the participant is currently in an online state through different colors. For example, green may indicate that the participant is currently in the online state, and gray may indicate that the participant is currently in an offline state. In addition, the visual component 900 may further include a number identification 930, to indicate the number of unread messages in the session.

For example, the visual component 900 may present a visual representation 940 of the latest unread message (e.g., "Have you had a meal") of the session with "Friend A." Additionally, the visual component 900A may further present the time 960 when the message is received (e.g., "3 minutes ago").

Further, as illustrated in FIG. 9B, when a predetermined operation 970 (e.g., downward sliding) for the visual component 900 is received, as illustrated in FIG. 9C, the visual component 900 may be switched to display the visual representation 980 of a further unread message.

In addition, as illustrated in FIG. 9C, the visual component 900 may further present the time 990 when the further unread message is sent/received.

Further, when the user clicks the visual representation 980, the electronic device 210 may present the session interface of the target session, and may cause the message corresponding to the selected visual representation 980 to be highlighted or adjusted to the appropriate display location in the session interface.

In this way, embodiments of the present disclosure may realize the aggregation presentation of a plurality of messages with the visual component, and may quickly preview a plurality of unread messages through appropriate sliding interaction, thereby improving the efficiency of message interaction.
Example Two In some embodiments, embodiments of the present disclosure may further provide the switching presentation of a plurality of messages in the target session with visual component.

In some embodiments, the visual component may further be configured to provide the visual representation of the message that has been sent by the current user in the session. FIGS. 10A-10C illustrate example visual components according to embodiments of the present disclosure.

As illustrated in FIG. 10A, visual component 1000A may present description information of the session associated with the visual component 1000A (e.g., the one-on-one session with "Friend A").

For example, the description information may include the identification of a participant of the session, such as the avatar 1010 of the "Friend A" and the identity identification 1016 (its nickname and/or remark) of the "Friend A".

Similarly, for example, the visual component 1000A may further present a status identification 1012 of the participant, which may indicate whether the participant is currently in an online state through different colors. For example, green may indicate that the participant is currently in the online state, and gray may indicate that the participant is currently in an offline state.

For example, when the latest message in the session is the latest sent message of the user, the visual component 1000A may present the visual representation 1014 of the latest sent message (e.g., text "Have had the meal") of the session with "Friend A". Additionally, the visual component 1000A may further present the time 1018 when the message is sent (e.g., "8 minutes ago").

In addition, the visual component 1000A may further include a sending identification configured to indicate that the visual representation 1014 corresponds to the latest sent message of the current user. For example, the sending identification may include a status identification 1020 configured to indicate a message status of the latest sent message. For example, the status identification 1020 may indicate a sending status of the latest sent message (e.g., whether it was successfully sent) or a reading status of the latest sent message (e.g., whether it has been read, or the number of people who have read it).

It should be understood that although in the example of FIG. 10A, the status identification 1020 is illustrated as a text style, it may also be represented in a graphic form, or other suitable form.

FIG. 10B illustrates an example visual component 1000B according to further embodiments of the present disclosure. As illustrated in FIG. 10B, the visual component 1000B may present the message associated with group chat session "Group B".

For example, the visual component 1000B may present description information of the group chat session, such as the avatar 1022 of the group chat session and the session identification 1026 (e.g., "Group B") of the group chat session.

In addition, for example, when the latest message in the session is the latest sent message of the user, the visual component 1000B may present a visual representation 1024 of the latest sent message (e.g., text "received") in the group chat session "Group B". In some embodiments, for example, unlike the visual representation of the one-on-one chat, the visual representation 1024 may additionally present the nickname or text "Me" of the sender (e.g., the current user). Further, the visual component 1000B may further present the time 1028 when the message is sent (e.g., "8 minutes ago").

In addition, the visual component 1000B may further include a sending identification configured to indicate that the visual representation 1024 corresponds to the latest sent message of the current user. For example, the sending identification may include a status identification 1030 configured to indicate a message status of the latest sent message. For example, the status identification 1030 may indicate a sending status of the latest sent message (e.g., whether it was successfully sent) or a reading status of the latest sent message (e.g., whether it has been read, or the number of people who have read it).

FIG. 10C illustrates an example visual component 1000C according to further embodiments of the present disclosure. As illustrated in FIG. 10C, the visual component 1000C may present the message associated with the one-on-one chat session of "Friend A".

For example, the visual component 1000C may present description information of the group chat session, such as the avatar and the nickname of "Friend A". In addition, for example, when the latest message in the session is the latest sent message of the user, the visual component 1000B may present a visual representation 1032 of the latest sent message (e.g., a picture message) in the group chat session "Group B". In addition, the visual component 1000C may further present the time when the message is sent (e.g., "3 minutes ago").

In addition, the visual component 1000C may further include a sending identification configured to indicate that the visual representation 1032 corresponds to the latest sent message of the current user. For example, the sending identification may include a status identification 1034 configured to indicate a message status of the latest sent message. For example, the status identification 1034 may indicate a sending status of the latest sent message (e.g., whether it was successfully sent) or a reading status of the latest sent message (e.g., whether it has been read, or the number of people who have read it).

In this way, embodiments of the present disclosure may further support the user to view the message that has been sent in the current session, and may distinguish, through the sending identification, whether the currently presented is the visual representation of the received message or the visual representation of the sent message.

In some embodiments, embodiments of the present disclosure may further support viewing different messages in the session with the visual component.

Figure 11A:
FIGS. 11A-11C illustrate schematic diagrams of switching different messages according to still further embodiments of the present disclosure.

FIG. 11A illustrates an example visual component 1100A according to some embodiments of the present disclosure. As illustrated in FIG. 11A, visual component 1100 may present description information for a session associated with the visual component 1100 (e.g., the one-on-one session with "Friend A").

For example, the description information may include the identification of a participant of the session, such as the avatar 1100 of the "Friend A" and the identity identification 1140 (its nickname and/or remark) of the "Friend A".

Similarly, for example, the visual component 1100A may further present a status identification 610 of the participant, which may indicate whether the participant is currently in an online state through different colors. For example, green may indicate that the participant is currently in the online state, and gray may indicate that the participant is currently in an offline state.

For example, the visual component 1100 may present the visual representation 1130 of the latest sent message (e.g., text "Have had the meal") of the session with "Friend A". Additionally, the visual component 1100A may further present the time 1150 when the message is received (e.g., "3 minutes ago").

Moreover, the visual component 1100 may further present a status identification 1160 to indicate that currently presented visual representation 1130 corresponds to the sent message in the session.

Figure 11B:
Figure 11C:
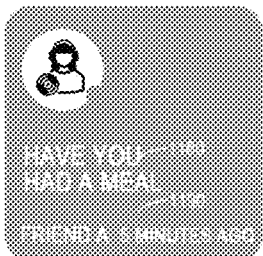

Further, as illustrated in FIG. 11B, when a predetermined operation 1170 (e.g., downward sliding) for the visual component 1100 is received, as illustrated in FIG. 11C, the visual component 1100 may be switched to display the visual representation 1180 of a further message in the session.

In addition, as illustrated in FIG. 11C, the visual component 1100 may further present the time 1190 when the further message is sent/received. In some embodiments, the further message to be switched to may be a message sequentially adjacent to the previous message (e.g., the text "Have you had a meal"), e.g., a sent/received message immediately preceding the message.

Further, when the user clicks the visual representation 1180, the electronic device 210 may present the session interface of the target session, and may cause the message corresponding to the selected visual representation 1180 to be highlighted or adjusted to the appropriate display location in the session interface.

In some embodiments, the user may further view earlier messages such as the text message "Have you had a meal" illustrated in 11C through sliding (e.g., downward sliding), or return to view the text message "Have had the meal" as illustrated in FIG. 11A through sliding (e.g., upward sliding).

In some embodiments, the switching between the different messages discussed above may also be performed in response to the user trigger on the predetermined switching control associated with the visual component.

In this way, embodiments of the present disclosure may realize the aggregation presentation of a plurality of messages with the visual component, and may quickly view the historical messages in the session through appropriate sliding interaction, thereby improving the efficiency of message interaction.

Presentation of Work Content

In some embodiments, the visual component may also be configured to present the work content of at least one participant in the session.

Figure 12A:
FIGS. 12A-12C illustrate schematic diagrams of example card-based components according to still further embodiments of the present disclosure.
Figure 12B:
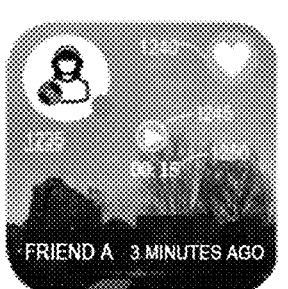
Figure 12C:

FIGS. 12A-12C illustrate example visual components according to some embodiments of the present disclosure. As illustrated in FIG. 12A, the visual component 1200A may correspond to the session with "Friend A."

In some embodiments, as illustrated in FIG. 12A, when it is determined that the "Friend A" has published a work content, the visual component 1200A may further be updated to present the visual representation 1215 of the work content.

Taking FIG. 12A as an example, similar to the visual representation for presenting the message, the visual component 1200A may include, for example, the avatar 1205 and the nickname 1225 of "Friend A". In addition, similarly, for example, the visual component 1200A may further include a status identification 1210 of "Friend A", which may indicate whether the "Friend A" is currently in an online state through different colors.

As illustrated in FIG. 12A, for example, in a case where it is determined that the "Friend A" has published the work content (e.g., a picture message), similar to providing the visual representation of the picture message in the session, the visual component 1200A may fill the picture in the work content as at least a portion of the background of the visual component 1200A as the visual representation 1215 of the work content.

It should be understood that the "work content" here may include content published by the participant in the target session for other users to browse and/or acquire. The content may include, for example, the text content, the picture content, the video content, the audio content, and/or any combination of the above.

Additionally, as illustrated in FIG. 12A, the visual component 1200A may further present the time 1230 when the "Friend A" publishes the work content.

In some embodiments, to distinguish the visual representations of the messages in the session, the visual component 1200A may further include an indication 1220 indicating that the current visual representation 1215 corresponds to the work content.

In some embodiments, for example, the indication 1220 may also be user interactable. For example, the user may click the indication 1220 to trigger a specific operation, e.g., liking, favorites, forwarding, etc., for the published work content.

It should be understood that, similar to the way different types of messages in the session are presented as discussed above, based on the type of the work content, the electronic device 210 may determine the visual representation of the work content presented in the visual component.

FIG. 12B illustrates a visual component 1200B for presenting a work content in a video format. As illustrated in FIG. 12B, similar to the visual component 1200A, the electronic device 210 may fill the visual component 1200B with a specific frame in the video associated with the work content as the visual representation 1235. In some embodiments, for example, the specific frame may be a start frame, a cover frame, or any other specified frame of the video associated with the work content.

In some embodiments, similar to the indication 1220, as illustrated in FIG. 12B, the visual component 1200B may further include an indication 1240 indicating that the current visual representation 1235 corresponds to the work content.

Additionally, the visual component 1200B may further include a play control 1245, which may be configured to control the play of the video content in the visual component 1200B without jumping to the viewing interface of the corresponding work content. Additionally, as illustrated in FIG. 12B, the visual component 1200B may further include duration information 1250 of the video content.

FIG. 12C illustrates a visual component 1200C for presenting a work content. For example, as illustrated in FIG. 12C, the work content to be presented may include the picture content and the text content. Accordingly, for example, the electronic device 210 may fill at least a portion of the background 1255 of the visual component 1200C with the picture associated with the work content, and concurrently present all or a portion of the text content 1265.

In some embodiments, the logic of the text content presentation may be similar to the presentation of the text symbol message in the session discussed above, i.e., it may determine whether to present all or a portion of the text content based on whether the length of the text content reaches a threshold length.

Similarly, the visual component 1200C may further include an indication 1260 indicating that the current visual representation (at least a portion of the background 1255 and all or a portion of the text content 1265 presented) corresponds to the work content.

In some embodiments, for the visual component, the electronic device 210 may present the visual representation of the acquired work content of the participant only when it is determined that there is no unread message in the target session corresponding to the visual component.

In other words, when there is an unread message in the target session, the corresponding visual component may always be configured to present the visual representation of the unread message, regardless of whether the participant has published the work content. When the user has further browsed the unread message and the subsequent participant has published the work content, the visual component may switch to presenting the visual representation of the work content.

In some embodiments, when the user selects the visual content in the visual component 1200A, the card 1200B or the card 1200C, or the user performs the predetermined operation (e.g., clicking the specific location) on the visual component 1200A, the card 1200B or the card 1200C, the electronic device 210 may accordingly present a corresponding viewing interface of the work content.

In this way, embodiments of the present disclosure may also reuse the visual component to present the work content of the participant in the session, which may further help the user improve the efficiency of message acquisition.

Providing of Widgets

Figure 13:
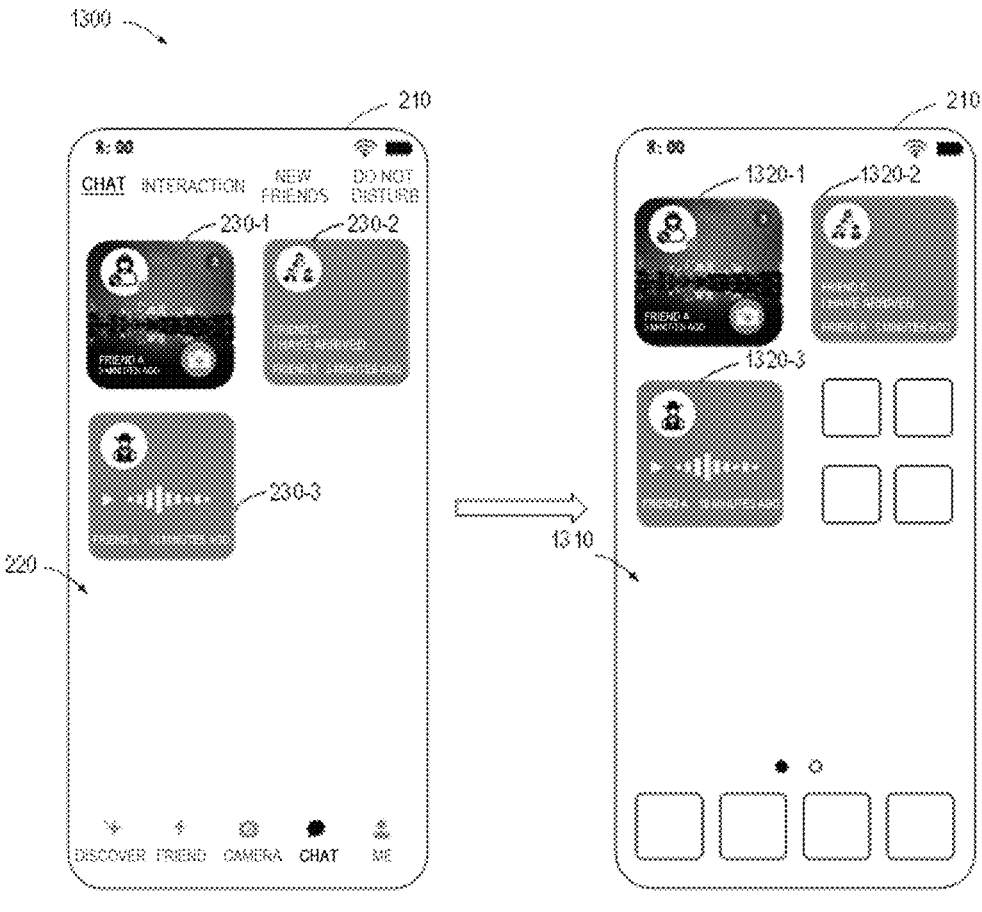
FIG. 13 illustrates a schematic diagram of presenting a corresponding widget according to some embodiments of the present disclosure.

In some embodiments, the electronic device 210 may further present the content corresponding to the visual component with a widget correspondingly. FIG. 13 illustrates a schematic diagram 1300 of presenting a message in a session with a widget.

As illustrated in FIG. 13, the electronic device 210 further provides, on an interface 1310 (e.g., a system desktop), widgets 1320-1, 1320-2, and 1320-3 (individually or collectively referred to as the widget 1320) corresponding to the session in the target application. The widget, also referred to as a widget, is a plug-in or component of various types provided on a specific page (e.g., the system desktop).

In some embodiments, the user may create the widget 1320 through an operating system entry of the electronic device 210. For example, the user may enter the widget configuration interface for adding widgets by long pressing the system desktop.

As an example, in the widget configuration interface, the user may view the widgets supported by various system applications and/or user applications of the electronic device 210. Further, for example, the electronic device 210 may receive, via the widget configuration interface, the user's request to create the widget, and add the widget corresponding to the target application to the system desktop.

In some embodiments, for example, the widget configuration interface may provide a session selection entry for the user, to allow the user to configure the session associated with the current widget. In some embodiments, the user may also create the widget 1320 through the session interface of the target application.

In some embodiments, as illustrated in FIG. 13, the content presented in the widget 1320 may correspond to the content presented in the visual component 230. For example, the widget 1320 may have a shape similar to the visual component 230, and its size, for example, may be scaled accordingly to fit the display in the interface 1310.

Additionally, for example, the content presented in the widget 1320 may be updated together with the visual component 230. In some embodiments, the visual component 230 and the widget 1320 may be updated independently of each other, but the corresponding display content is always maintained. Alternatively, the update of the content in the visual component 230 and the widget 1320 may always depend on the other party. For example, the update of the visual component 230 may be configured to trigger the corresponding widget 1320 to be updated accordingly.

In some embodiments, for example, the widget 1320 may have the same interaction logic as the corresponding visual component 230. For example, a selection of the widget 1320 may also trigger the electronic device 210 to present the session interface corresponding to the target session. Other interaction mechanisms may refer to the content described above with respect to the visual component 230, and details are not described herein again.

In this way, embodiments of the present disclosure may further conveniently provide the visual representation of the message received in the session with the widget, thereby facilitating the user to more quickly and intuitively acquire the message content in the session.

Example Processes

Figure 14:
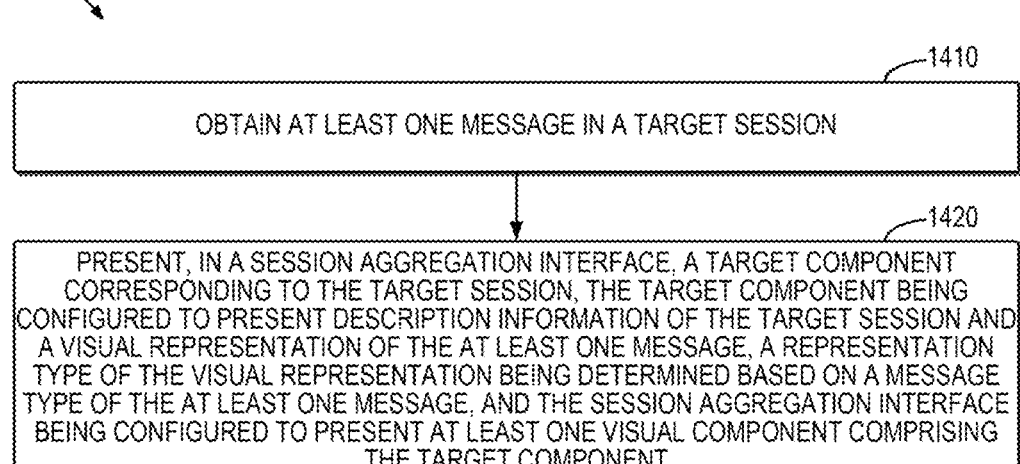
FIG. 14 illustrates a flowchart of an example process for presenting a session message according to some embodiments of the present disclosure.

FIG. 14 illustrates a flowchart of an example process 1400 for presenting a session message according to some embodiments of the present disclosure. The process 1400 may be implemented independently of the electronic device 210 of FIG. 2, or may be implemented by a combination of the electronic device 210 and other computing devices. For ease of discussion, the process 1400 will be described with reference to FIG. 2.

As illustrated in FIG. 14, at block 1410, the electronic device 210 obtains at least one message in the target session.

At block 1420, the electronic device 210 presents, in a session aggregation interface, a target component corresponding to the target session. The target component is configured to present description information of the target session and a visual representation of the at least one message, a representation type of the visual representation is determined based on a message type of the at least one message, and the session aggregation interface is configured to present at least one visual component including the target component.

In some embodiments, the method further includes in response to receiving a first predetermined operation for the target component, presenting a session interface of the target session. The session interface is configured to present the at least one message.

In some embodiments, the first predetermined operation includes a selection of the visual representation.

In some embodiments, the description information of the target session includes at least one of: a session identification of the target session; a participant identification of at least one participant of the target session; or a status identification of at least one participant of the target session. The status identification is configured to indicate whether the at least one participant is in an online state. The session representation, the participant identification, or the status identification includes a text identification and/or a graphic identification.

In some embodiments, obtaining at least one message in the target session includes: obtaining a latest received message and/or a latest sent message in the target session; obtaining at least one unread message in the target session; or obtaining a call request message being received in the target session.

In some embodiments, the at least one message includes an image content message, and presenting, in a session aggregation interface, a target component corresponding to the target session includes: presenting the target component. A picture associated with the image content message is configured to fill at least a portion of a background of the target component as the visual representation of the image content message.

In some embodiments, the image content message includes a picture message. The picture in the picture message is configured to fill at least a portion of the background of the target component as a visual representation of the picture message.

In some embodiments, the image content message includes a video message, and a target frame of a video in the video message is configured to fill at least the portion of the background of the target component as a visual representation of the video message.

In some embodiments, the method further includes in response to a selection of the visual representation, causing the video in the video message to be played at a session interface of the target session.

In some embodiments, the at least one message includes a message of a specific type, and the message of the specific type includes at least one of: a voice message, a red packet message, a location message, a conference message, a file message, an invitation message, a call request message, or a hyperlink message. The visual representation supports an associated interaction operation corresponding to a type of the message of the specific type.

In some embodiments, presenting, in a session aggregation interface, a target component corresponding to the target session includes presenting the target component. The target component includes a graphical representation corresponding to the message of the specific type as a visual representation of the message of the specific type.

In some embodiments, the target session is a first session, the target component is a first component, and the at least one visual component includes a second component corresponding to the second session.

In some embodiments, a display style and/or a display location of the at least one visual component in the session aggregation interface is determined based on a user operation.

In some embodiments, the at least one visual component is configured at a predetermined location in the session aggregation interface based on a user gesture operation. The display style of the at least one visual component is adjusted based on a user gesture operation.

In some embodiments, the at least one message includes a voice message or a video message, and the target component further includes a play entry configured to play the voice message on the session aggregation interface and/or play the video message in the target component.

In some embodiments, the at least one message includes a call request message, and the target component further includes a reply entry configured to establish a voice call or a video call corresponding to the call request message on the session aggregation interface.

In some embodiments, the reply entry is configured to establish a video call corresponding to the call request message, and the target component presents a video image associated with the video call during an establishment of the video call.

In some embodiments, the at least one message is a message received in the target session, and the target component further includes a shortcut reply entry configured to generate a reply message for the at least one message based on the target component.

In some embodiments, the shortcut reply entry includes a voice reply entry, and the method further includes in response to a selection of the voice reply entry, acquiring a reply audio with an audio acquisition device; and sending the reply audio as the reply message to the target session.

In some embodiments, the shortcut reply entry includes an expression reply entry, and the expression reply entry includes a set of candidate expressions. The method further includes in response to a selection of a target expression in the set of candidate expressions, sending the target expression as the reply message to the target session.

In some embodiments, the shortcut reply entry includes an image or a video reply entry, and the method further includes in response to a selection of the image or video reply entry, converting the target component to a framing state for acquiring an image or a video with an image acquisition device; and sending, as the reply message, the image or the video acquired based on the target component to the target session.

In some embodiments, in a session interface of the target session, the reply message is marked as a reply to the at least one message.

In some embodiments, the at least one message is a first message, and the visual representation is a first visual representation corresponding to the first message. The method further includes switching, in response to a second predetermined operation for the target component, the target component to present a second visual representation of a second message in the at least one message.

In some embodiments, the second predetermined operation includes sliding, or a trigger on a predetermined switching control associated with the target component.

In some embodiments, the first message and the second message are a plurality of unread messages in the target session. The first message and the second message are sequentially adjacent messages in the target session.

In some embodiments, the method further includes determining that a participant of the target session has published a work content; and updating the target component, to cause the target component to present a third visual representation of the work content.

In some embodiments, updating the target component includes in response to an absence of an unread message in the target session, updating the target component, to cause the target component to present the third visual representation of the work content.

In some embodiments, the target component further presents a predetermined identification indicating that the third visual representation corresponds to the work content.

In some embodiments, the at least one message includes a latest sent message in the target session, and the target component further presents a sending identification indicating that the visual representation corresponds to the latest sent message.

In some embodiments, the sending identification includes a status identification configured to indicate a message status of the latest sent message, and the message status includes a sending status of the latest sent message or a reading status of the latest sent message.

In some embodiments, a presentation location and/or a presentation style of the description information is determined based on the representation type of the visual representation.

In some embodiments, a background fill pattern of the target component is determined based on a first attribute associated with the target session and/or a second attribute associated with the visual representation.

In some embodiments, the representation type of the visual representation includes at least one of a text representation, a graphical representation, or a video representation.

In some embodiments, the method further includes providing a widget associated with the target session. The widget presents content corresponds to the visual component.

Example Apparatus and Device

Figure 15:
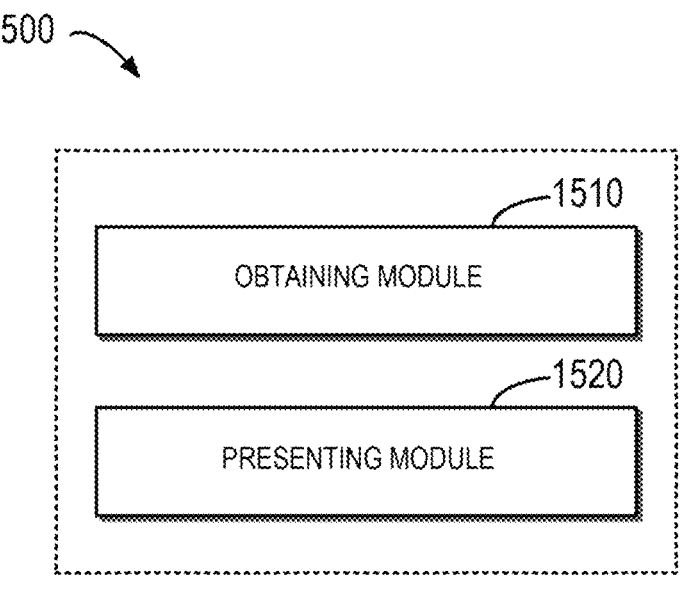
FIG. 15 illustrates a block diagram of an apparatus for presenting a session message according to some embodiments of the present disclosure.

Embodiments of the present disclosure further provide a corresponding apparatus for implementing the above method or process. FIG. 15 is a schematic block diagram of an apparatus 1500 for presenting a session message according to some embodiments of the present disclosure.

As illustrated in FIG. 15, the apparatus 1500 includes an obtaining module 1510. The obtaining module 1510 is configured to obtain at least one message in a target session.

The apparatus 1500 further includes a presenting module 1520. The presenting module 1520 is configured to present, in a session aggregation interface, a target component corresponding to the target session. The target component is configured to present description information of the target session and a visual representation of the at least one message, a representation type of the visual representation is determined based on a message type of the at least one message, and the session aggregation interface is configured to present at least one visual component including the target component.

In some embodiments, the presenting module 1520 is further configured to in response to receiving a first predetermined operation for the target component, present a session interface of the target session. The session interface is configured to present the at least one message.

In some embodiments, the first predetermined operation includes a selection of the visual representation.

In some embodiments, the description information of the target session includes at least one of: a session identification of the target session; a participant identification of at least one participant of the target session; or a status identification of at least one participant of the target session. The status identification is configured to indicate whether the at least one participant is in an online state. The session representation, the participant identification, or the status identification includes a text identification and/or a graphic identification.

In some embodiments, the obtaining module 1510 is further configured to: obtain a latest received message and/or a latest sent message in the target session; obtain at least one unread message in the target session; or obtain a call request message being received in the target session.

In some embodiments, the at least one message includes an image content message. The presenting module 1520 is further configured to present the target component. A picture associated with the image content message is configured to fill at least a portion of a background of the target component as the visual representation of the image content message.

In some embodiments, the image content message includes a picture message. The picture in the picture message is configured to fill at least a portion of the background of the target component as a visual representation of the picture message.

In some embodiments, the image content message includes a video message, and a target frame of a video in the video message is configured to fill at least the portion of the background of the target component as a visual representation of the video message.

In some embodiments, the presenting module 1520 is further configured to in response to a selection of the visual representation, cause the video in the video message to be played at a session interface of the target session.

In some embodiments, the at least one message includes a message of a specific type, and the message of the specific type includes at least one of: a voice message, a red packet message, a location message, a conference message, a file message, an invitation message, a call request message, or a hyperlink message. The visual representation supports an associated interaction operation corresponding to a type of the message of the specific type.

In some embodiments, the presenting module 1520 is further configured to present, in a session aggregation interface, a target component corresponding to the target session includes presenting the target component. The target component includes a graphical representation corresponding to the message of the specific type as a visual representation of the message of the specific type.

In some embodiments, the target session is a first session, the target component is a first component, and the at least one visual component includes a second component corresponding to the second session.

In some embodiments, a display style and/or a display location of the at least one visual component in the session aggregation interface is determined based on a user operation.

In some embodiments, the at least one visual component is configured at a predetermined location in the session aggregation interface based on a user gesture operation. The display style of the at least one visual component is adjusted based on a user gesture operation.

In some embodiments, the at least one message includes a voice message or a video message, and the target component further includes a play entry configured to play the voice message on the session aggregation interface and/or play the video message in the target component.

In some embodiments, the at least one message includes a call request message, and the target component further includes a reply entry configured to establish a voice call or a video call corresponding to the call request message on the session aggregation interface.

In some embodiments, the reply entry is configured to establish a video call corresponding to the call request message, and the target component presents a video image associated with the video call during an establishment of the video call.

In some embodiments, the at least one message is a message received in the target session, and the target component further includes a shortcut reply entry configured to generate a reply message for the at least one message based on the target component.

In some embodiments, the shortcut reply entry includes a voice reply entry, and the presenting module 1520 is further configured to in response to a selection of the voice reply entry, acquire a reply audio with an audio acquisition device; and send the reply audio as the reply message to the target session.

In some embodiments, the shortcut reply entry includes an expression reply entry, and the expression reply entry includes a set of candidate expressions. The presenting module 1520 is further configured to in response to a selection of a target expression in the set of candidate expressions, send the target expression as the reply message to the target session.

In some embodiments, the shortcut reply entry includes an image or a video reply entry, and the presenting module 1520 is further configured to in response to a selection of the image or video reply entry, convert the target component to a framing state for acquiring an image or a video with an image acquisition device; and send, as the reply message, the image or the video acquired based on the target component to the target session.

In some embodiments, in a session interface of the target session, the reply message is marked as a reply to the at least one message.

In some embodiments, the at least one message is a first message, and the visual representation is a first visual representation corresponding to the first message. The presenting module 1520 is further configured to switch, in response to a second predetermined operation for the target component, the target component to present a second visual representation of a second message in the at least one message.

In some embodiments, the second predetermined operation includes sliding, or a trigger on a predetermined switching control associated with the target component.

In some embodiments, the first message and the second message are a plurality of unread messages in the target session. The first message and the second message are sequentially adjacent messages in the target session.

In some embodiments, the presenting module 1520 is further configured to determine that a participant of the target session has published a work content; and update the target component, to cause the target component to present a third visual representation of the work content.

In some embodiments, the presenting module 1520 is further configured to in response to an absence of an unread message in the target session, update the target component, to cause the target component to present the third visual representation of the work content.

In some embodiments, the target component further presents a predetermined identification indicating that the third visual representation corresponds to the work content.

In some embodiments, the at least one message includes a latest sent message in the target session, and the target component further presents a sending identification indicating that the visual representation corresponds to the latest sent message.

In some embodiments, the sending identification includes a status identification configured to indicate a message status of the latest sent message, and the message status includes a sending status of the latest sent message or a reading status of the latest sent message.

In some embodiments, a presentation location and/or a presentation style of the description information is determined based on the representation type of the visual representation.

In some embodiments, a background fill pattern of the target component is determined based on a first attribute associated with the target session and/or a second attribute associated with the visual representation.

In some embodiments, the representation type of the visual representation includes at least one of a text representation, a graphical representation, or a video representation.

In some embodiments, the apparatus 1500 further includes a widget providing module configured to provide a widget associated with the target session. The widget presents content corresponds to the visual component.

The units included in the apparatus 1500 may be implemented in various manners, including software, hardware, firmware, or any combination thereof. In some embodiments, one or more units may be implemented using software and/or firmware, such as machine-executable instructions stored on a storage medium. In addition to or as an alternative to machine-executable instructions, some or all of the elements in the apparatus 1500 may be implemented, at least in part, by one or more hardware logic components. By way of example and not limitation, illustrative types of hardware logic components that may be used include field programmable gate arrays (FPGAs), application specific integrated circuits (ASICs), application specific standards (ASSPs), system-on-a-chip (SOCs), complex programmable logic devices (CPLDs), etc.

Figure 16:
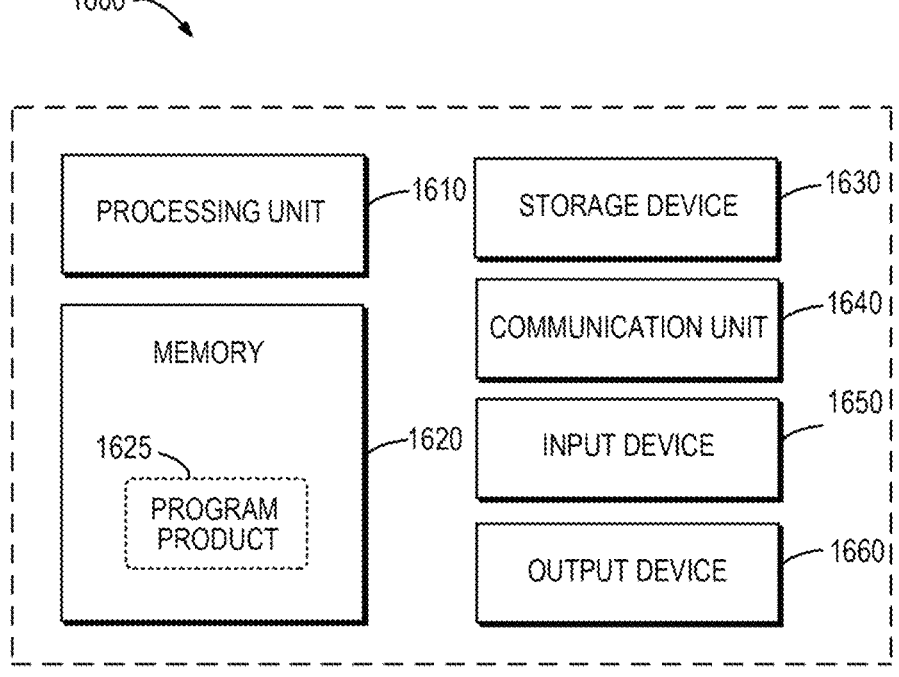
FIG. 16 illustrates a block diagram of a device capable of implementing various embodiments of the present disclosure.

FIG. 16 illustrates a block diagram of a computing device/server 1600 in which one or more embodiments of the present disclosure may be implemented. It should be understood that the computing device/server 1600 illustrated in FIG. 16 is merely illustrative and should not constitute any limitation on the functionality and scope of the embodiments described herein.

As illustrated in FIG. 16, the computing device/server 1600 is in the form of a general-purpose computing device. Components of the computing device/server 1600 may include, but are not limited to, one or more processors or processing units 1610, a memory 1620, a storage device 1630, one or more communication units 1640, one or more input devices 1660, and one or more output devices 1660. The processing unit 1610 may be an actual or virtual processor and capable of performing various processes according to programs stored in the memory 1620. In multiprocessor systems, a plurality of processing units execute computer-executable instructions in parallel to improve the parallel processing capability of computing device/server 1600.

Computing device/server 1600 typically includes a plurality of computer storage media. Such media may be any available media accessible by the computing device/server 1600, including, but not limited to, volatile and non-volatile media, removable and non-removable media. The memory 1620 may be volatile memory (e.g., registers, caches, random access memory (RAM)), non-volatile memory (e.g., read-only memory (ROM), electrically erasable programmable read-only memory (EEPROM), flash memory), or some combination thereof. Storage device 1630 may be a removable or non-removable medium and may include a machine-readable medium, such as a flash drive, magnetic disk, or any other medium, which may be capable of storing information and/or data (e.g., training data for training) and may be accessed within computing device/server 1600.

The computing device/server 1600 may further include additional removable/non-removable, volatile/non-volatile storage media. Although not illustrated in FIG. 16, a disk drive for reading or writing from a removable, nonvolatile magnetic disk (e.g., a "floppy disk") and an optical disk drive for reading or writing from a removable, nonvolatile optical disk may be provided. In these cases, each drive may be connected to a bus (not illustrated) by one or more data media interfaces. The memory 1620 may include a computer program product 1625 having one or more program modules configured to perform various methods or actions of various embodiments of the present disclosure.

The communications unit 1640 implements communications with other computing devices over a communications medium. Additionally, the functionality of components of the computing device/server 1600 may be implemented in a single computing cluster or multiple computing machines capable of communicating over a communication connection. Thus, the computing device/server 1600 may operate in a networked environment using logical connections with one or more other servers, network personal computers (PCs), or another network node.

The input device 1650 may be one or more input devices such as a mouse, a keyboard, a trackball, etc. The output device 1660 may be one or more output devices, such as a display, a speaker, a printer, etc. Computing device/server 1600 may also communicate with one or more external devices (not illustrated) as needed, external devices such as storage devices, display devices, etc., communicate with one or more devices that enable a user to interact with computing device/server 1600, or communicate with any device (e.g., network card, modem, etc.) that enables computing device/server 1600 to communicate with one or more other computing devices. Such communication may be performed via an input/output (I/O) interface (not illustrated).

According to example implementations of the present disclosure, a computer-readable storage medium is provided. The computer-readable storage medium has one or more computer instructions stored thereon, when one or more computer instructions are executed by a processor, the method described above is performed.

Aspects of the present disclosure are described herein with reference to flowcharts and/or block diagrams of methods, apparatuses (systems), and computer program products implemented in accordance with the present disclosure. It should be understood that each block of the flowchart and/or block diagram, and combinations of blocks in the flowcharts and/or block diagrams, may be implemented by computer readable program instructions.

These computer-readable program instructions may be provided to a processing unit of a general purpose computer, special purpose computer, or other programmable data processing apparatus to produce a machine, such that the instructions, when executed by a processing unit of a computer or other programmable data processing apparatus, produce means to implement the functions/acts specified in the flowchart and/or block diagram. These computer-readable program instructions may also be stored in a computer-readable storage medium that cause the computer, programmable data processing apparatus, and/or other devices to function in a specific manner, such that the computer-readable medium storing instructions includes an article of manufacture including instructions to implement aspects of the functions/acts specified in the flowchart and/or block diagram(s).

The computer-readable program instructions may also be loaded onto a computer, other programmable data processing apparatus, or other apparatus, such that a series of operational steps are performed on a computer, other programmable data processing apparatus, or other apparatus to produce a computer-implemented process such that the instructions executed on a computer, other programmable data processing apparatus, or other apparatus implement the functions/acts specified in the flowchart and/or block diagram block or blocks.

The flowchart and block diagrams in the figures show architecture, functionality, and operation of possible implementations of systems, methods, and computer program products according to various implementations of the present disclosure. In this regard, each block in the flowchart or block diagram may represent a module, program segment, or portion of an instruction that includes one or more executable instructions for implementing the specified logical function. In some alternative implementations, the functions noted in the blocks may also occur in a different order than noted in the figures. For example, two consecutive blocks may actually be performed substantially in parallel, which may sometimes be performed in the reverse order, depending on the functionality involved. It is also noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various implementations of the present disclosure have been described above, which are illustrative, not exhaustive, and are not limited to the implementations disclosed. Many modifications and variations will be apparent to those of ordinary skill in the art without departing from the scope and spirit of the various implementations illustrated. The selection of the terms used herein is intended to best explain the principles of the implementations, practical applications, or improvements to techniques in the marketplace, or to enable others of ordinary skill in the art to understand the implementations disclosed herein.

The invention claimed is:

1. A method for presenting a session message, comprising:
obtaining at least one message in a session;
acquiring a visual representation of the at least one message generated based on at least one picture comprised in the at least one message, wherein the visual representation of the at least one message is generated by filling at least a portion of a background of the visual representation with the at least one picture; and
presenting, on a session aggregation interface, a first component corresponding to the session, wherein the first component comprises description information of the session and the visual representation of the at least one message, wherein a type of the visual representation of the at least one message is determined based on a type of the at least one message, and wherein the session aggregation interface is configured to present at least one visual component comprising the first component.

2. The method of claim 1, further comprising:
in response to receiving a first predetermined operation for the first component, presenting a session interface of the session, the session interface being configured to present the at least one message.

3. The method of claim 1, wherein the description information of the session comprises at least one of:
a session identification of the session;
a participant identification of at least one participant of the session; or
a status identification of at least one participant of the session, configured to indicate whether the at least one participant is in an online state,
wherein the session representation, the participant identification, or the status identification comprises a text identification and/or a graphic identification.

4. The method of claim 1, wherein the obtaining at least one message in a session comprises:
obtaining a latest received message and/or a latest sent message in the session;
obtaining at least one unread message in the session; or
obtaining a call request message being received in the session.

5. The method of claim 1, wherein the at least one message comprises an image content message, and the presenting, in a session aggregation interface, a first component corresponding to the session comprises:
presenting the first component, wherein a picture associated with the image content message is configured to fill at least a portion of a background of the first component as the visual representation of the image content message.

6. The method of claim 5, wherein the image content message comprises a picture message, and a picture in the picture message is configured to fill at least the portion of the background of the first component as a visual representation of the picture message, or
wherein the image content message comprises a video message, and a target frame of a video in the video message is configured to fill at least the portion of the background of the first component as a visual representation of the video message.

7. The method of claim 1, wherein the at least one message comprises a message of a specific type, and the message of the specific type comprises at least one of: a voice message, a red packet message, a location message, a conference message, a file message, an invitation message, a call request message, or a hyperlink message, wherein the visual representation supports an associated interaction operation corresponding to a type of the message of the specific type.

8. The method of claim 7, wherein the presenting, in a session aggregation interface, a first component corresponding to the session comprises:

presenting the first component, wherein the first component comprises a graphical representation corresponding to the message of the specific type as a visual representation of the message of the specific type.

9. The method of claim 1, wherein the session is a first session, the first component is a first component, and the at least one visual component comprises a second component corresponding to a second session, or wherein a display style and/or a display location of the at least one visual component in the session aggregation interface is determined based on a user operation, or wherein the at least one message comprises a voice message or a video message, and the first component further comprises a play entry configured to play the voice message on the session aggregation interface and/or play the video message in the first component.

10. The method of claim 1, wherein the at least one message comprises a call request message, and the first component further comprises a reply entry configured to establish a voice call or a video call corresponding to the call request message on the session aggregation interface.

11. The method of claim 10, wherein the reply entry is configured to establish a video call corresponding to the call request message, and the first component presents a video image associated with the video call during an establishment of the video call.

12. The method of claim 1, wherein the at least one message is a message received in the session, and the first component further comprises a shortcut reply entry configured to generate a reply message for the at least one message based on the first component.

13. The method of claim 12, wherein the shortcut reply entry comprises a voice reply entry, and the method further comprises: in response to a selection of the voice reply entry, acquiring a reply audio with an audio acquisition device; and sending the reply audio as the reply message to the session, or wherein the shortcut reply entry comprises an emoji reply entry, the emoji reply entry comprises a set of candidate emojis, and the method further comprises: in response to a selection of an emoji in the set of candidate emojis, sending the emoji as the reply message to the session, or wherein the shortcut reply entry comprises an image or video reply entry, and the method further comprises: in response to a selection of the image or video reply entry, converting the first component to a framing state for acquiring an image or a video with an image acquisition device; and sending, as the reply message, the image or the video acquired based on the first component to the session, or wherein in a session interface of the session, the reply message is marked as a reply to the at least one message.

14. The method of claim 1, wherein the at least one message is a first message, the visual representation is a first visual representation corresponding to the first message, and the method further comprises:

switching, in response to a second predetermined operation for the first component, the first component to present a second visual representation of a second message in the at least one message.

15. The method of claim 14, wherein the second predetermined operation comprises sliding, or a trigger on a predetermined switching control associated with the first component, or wherein the first message and the second message are a plurality of unread messages in the session; and/or the first message and the second message are sequentially adjacent messages in the session.

16. The method of claim 1, further comprising:

determining that a participant of the session has published a work content; and updating the first component, to cause the first component to present a third visual representation of the work content.

17. The method of claim 1, wherein the at least one message comprises a latest sent message in the session, and the first component further presents a sending identification indicating that the visual representation corresponds to the latest sent message, or wherein a presentation location and/or a presentation style of the description information is determined based on the representation type of the visual representation, or wherein a background fill pattern of the first component is determined based on a first attribute associated with the session and/or a second attribute associated with the visual representation, or wherein the representation type of the visual representation comprises at least one of a text representation, a graphical representation, or a video representation.

18. The method of claim 1, further comprising:

providing a widget associated with the session, wherein the widget presents content corresponding to the visual component.

19. An electronic device, comprising:

at least one processing unit; and at least one memory coupled to the at least one processing unit and storing instructions executable by the at least one processing unit, the instructions, when executed by the at least one processing unit, causing the electronic device to perform operations comprising:

obtaining at least one message in a session;

acquiring a visual representation of the at least one message generated based on at least one picture comprised in the at least one message, wherein the visual representation of the at least one message is generated by filling at least a portion of a background of the visual representation with the at least one picture; and presenting, on a session aggregation interface, a first component corresponding to the session, wherein the first component comprises description information of the session and the visual representation of the at least one message, wherein a type of the visual representation of the at least one message is determined based on a type of the at least one message, and wherein the session aggregation interface is configured to present at least one visual component comprising the first component.

20. A non-transitory computer-readable storage medium having a computer program stored thereon, the computer program, when executed by a processor, performing operations comprising:

obtaining at least one message in a session;

acquiring a visual representation of the at least one message generated based on at least one picture comprised in the at least one message, wherein the visual representation of the at least one message is generated by filling at least a portion of a background of the visual representation with the at least one picture; and presenting, on a session aggregation interface, a first component corresponding to the session, wherein the first component comprises is configured to present description information of the session and the visual representation of the at least one message, wherein a type of the visual representation of the at least one message is determined based on a type of the at least one message, and wherein the session aggregation interface is configured to present at least one visual component comprising the first component.

\* \* \* \* \*